Jan. 26, 1965  E. W. SCHELLENTRAGER  3,167,139
SCALE DIALS

Filed Jan. 22, 1962  7 Sheets-Sheet 1

INVENTOR.
EUGENE W. SCHELLENTRAGER
BY
*Meyer, Baldwin, Doran & Egan*
ATTORNEYS

Jan. 26, 1965   E. W. SCHELLENTRAGER   3,167,139
SCALE DIALS
Filed Jan. 22, 1962   7 Sheets-Sheet 2
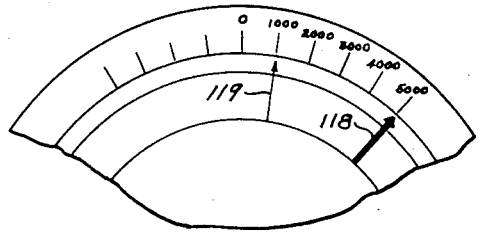
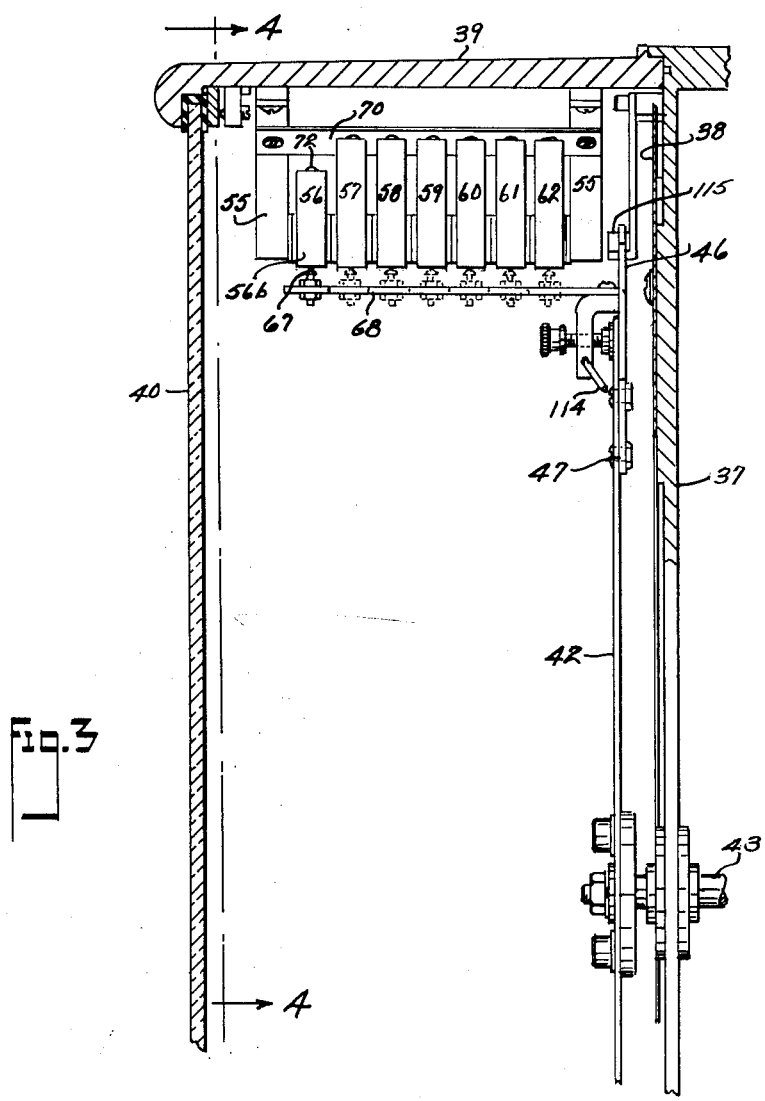
INVENTOR.
EUGENE W. SCHELLENTRAGER
BY
Meyer, Baldwin, Doran & Egan
ATTORNEYS

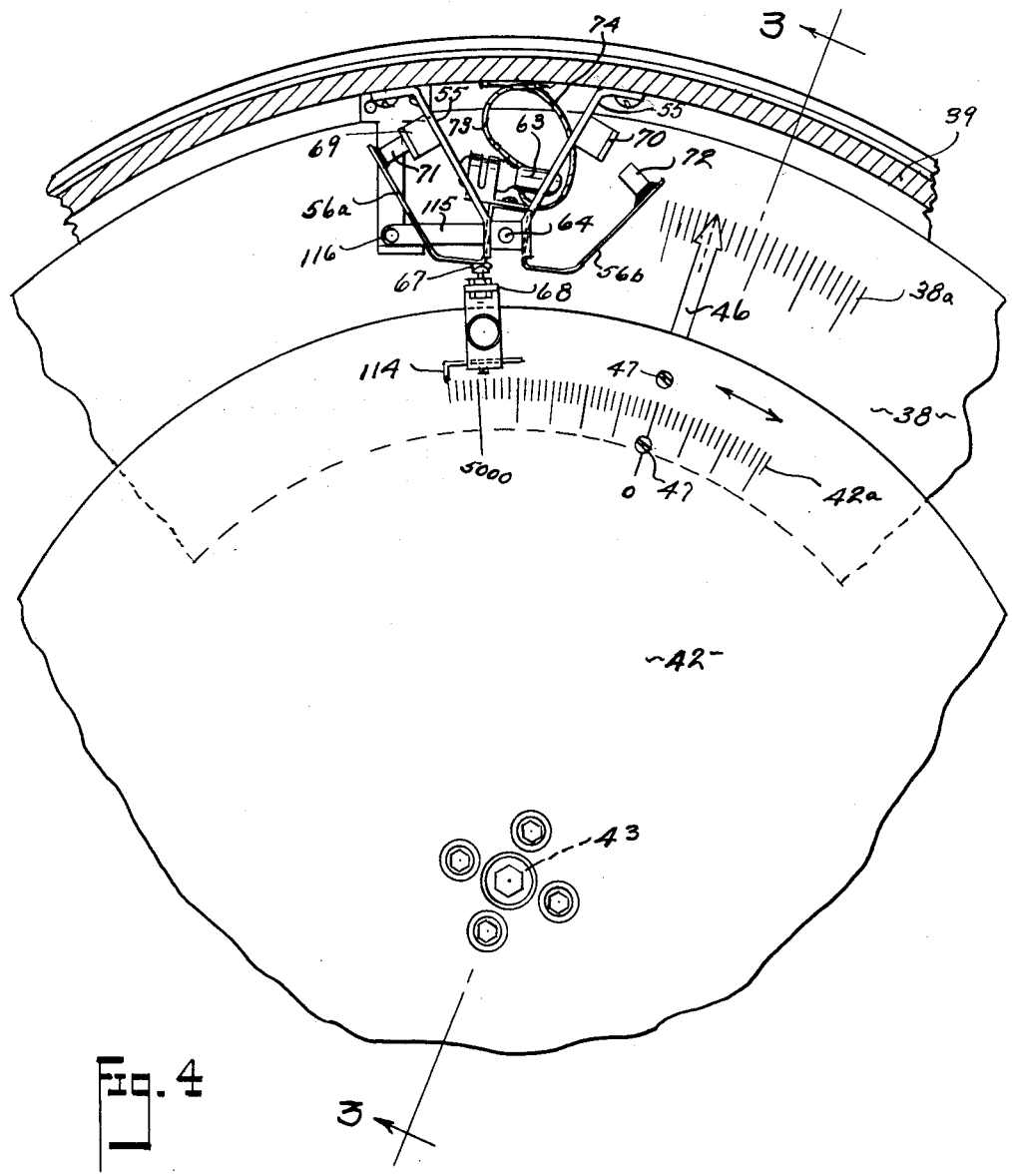

Jan. 26, 1965    E. W. SCHELLENTRAGER    3,167,139
SCALE DIALS
Filed Jan. 22, 1962    7 Sheets-Sheet 4
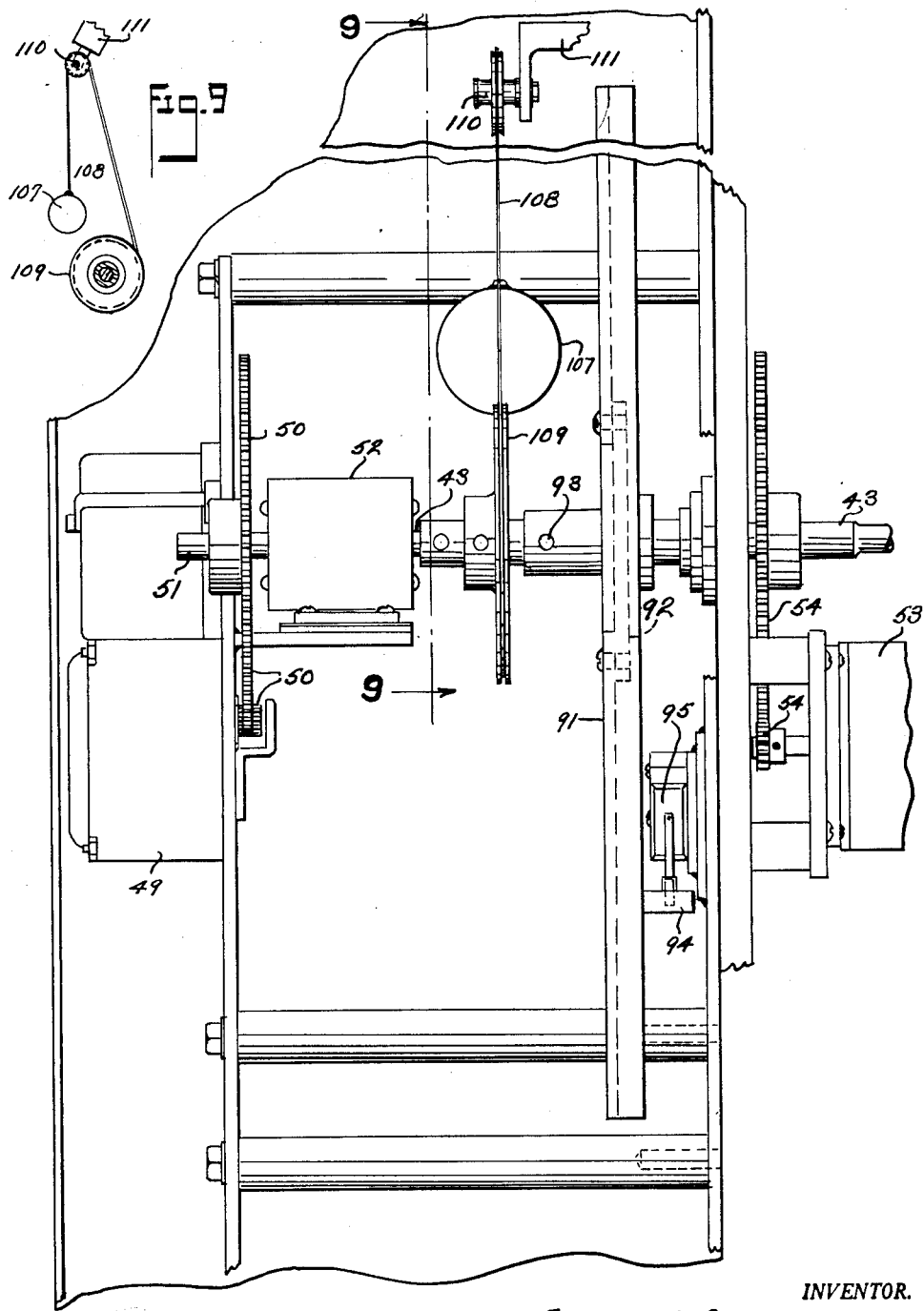
INVENTOR.
EUGENE W. SCHELLENTRAGER
BY
Meyer, Baldwin, Doran & Egan
ATTORNEYS

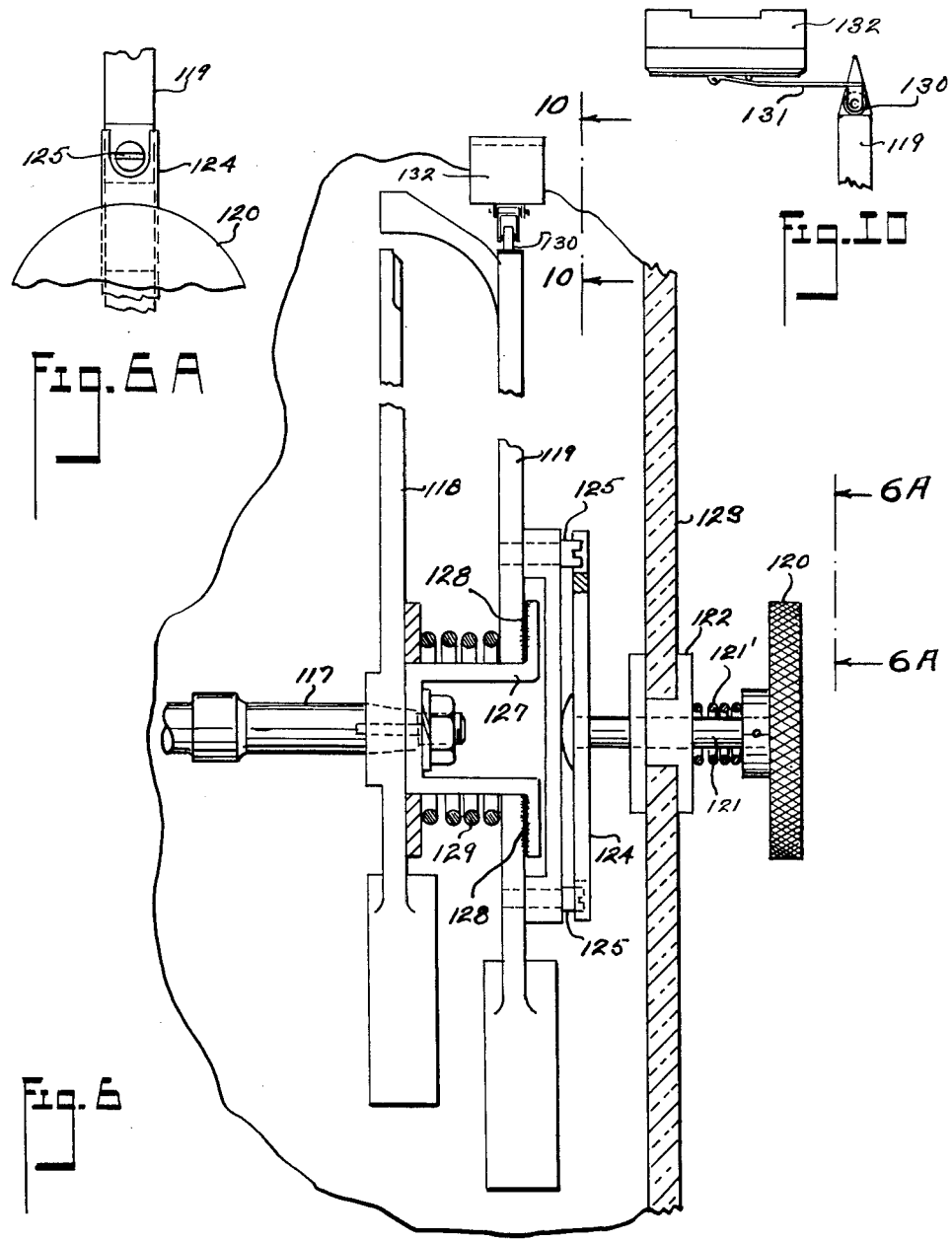

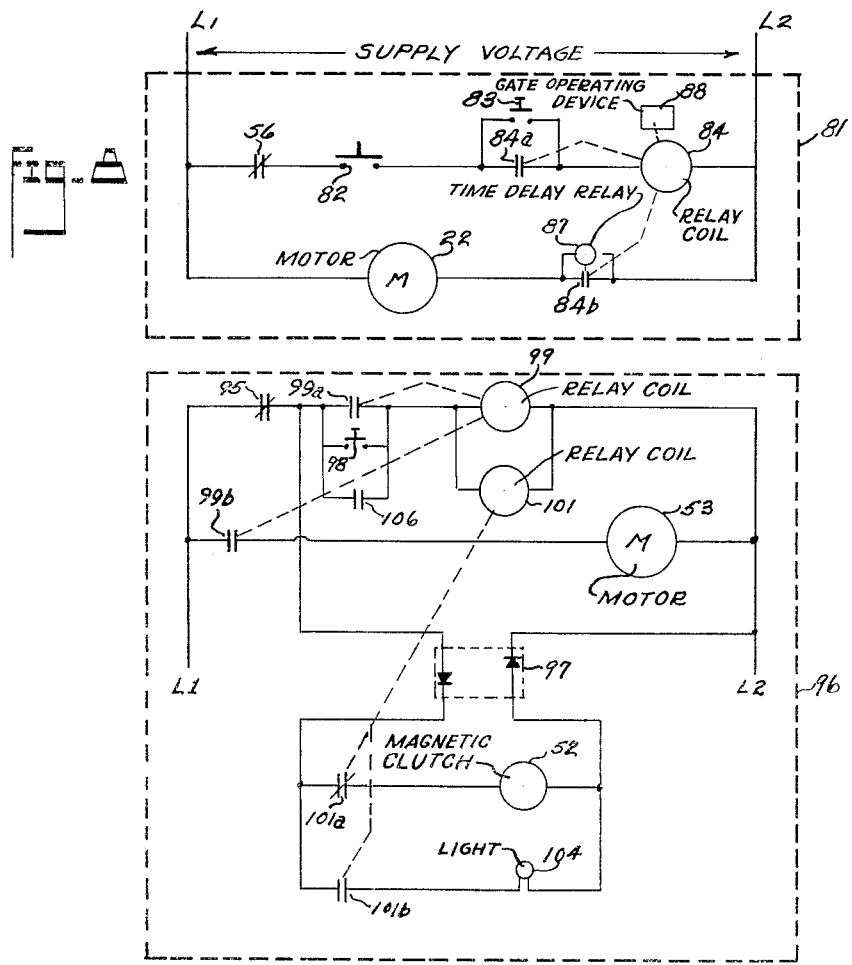

United States Patent Office 3,167,139
Patented Jan. 26, 1965

3,167,139
SCALE DIALS
Eugene W. Schellentrager, Shaker Heights, Ohio, assignor to The Atlas Bolt & Screw Company, Cleveland, Ohio, a corporation of Ohio
Filed Jan. 22, 1962, Ser. No. 167,832
6 Claims. (Cl. 177—70)

The invention relates to novel and improved scale dials having functionally and structurally combined control features. It relates particularly to apparatus of this nature for indicating, controlling, and recording successive increments of a total load, such as is supplied, for example to a conveyor used in carrying raw materials to the skip hoist of a blast furnace.

As is well known to those skilled in the metallurgical arts, predetermined charges of raw materials such as sinter, limestone, iron ore, etc., are conveyed from a receiving zone to the skip hoist of the furnace which elevates the material and dumps it into a hopper at the furnace top. The process is a continuous one, over relatively extended periods, and as the charged materials settle to the molten zone fresh charges are periodically added.

It is necessary that the amounts of the several ingredients be carefully pre-determined in the light of various operating factors and the weight and character of each charge should be controlled and recorded in such manner as to eliminate the personal equation comprising the fallibility of unskilled or only partially skilled operators.

Weight totalizing, recording and identifying devices have previously been disclosed in the art, for example in my prior U.S. Patent No. 1,909,724, granted May 16, 1933 and U.S. Patent No. 2,610,843, granted September 16, 1952.

An object of the present invention is to provide improved means in operative association with a scale dial for individually indicating the weights of a plurality of ingredients, and for controlling the amount of each respective ingredient supplied for example to a conveyor.

A further object of the invention is to provide improved means as defined in the last preceding paragraph for indicating, recording, and controlling the weight of individual lots of materials, and for returning the scale dial indicator to zero after each individual operation.

A further object of the invention is to provide improved control means as defined is the last preceding paragraph wherein the individual lots of repective ingredients can be selected, weighed, and delivered in any desired sequence by simple adjustment of devices carried by a movable part of the scale dial.

A further object of the invention is to provide compensation for errors heretofore resulting from unsharp cutoff at the material supply valve, namely terminal trickle of the material onto the conveyor after the valve or gate is shut off, or from the conveyor to the ultimate receptacle.

A further object of the invention is to provide individual visual indication of the amount of a particular ingredient withdrawn from a source in addition to the total amount of ingredients previously delivered from said source, in such way that the operator need not do subtraction computation to determine the amount remaining in the hopper. The significance of this object of the invention will be more fully explained hereinafter.

Other objects and advantages will be apparent from a study of the following description, in conjunction with the accompanying drawings, in which:

FIG. 3 is a vertical sectional view with the dial housing cover closed, and greatly enlarged, as seen on the line 3—3 of FIG. 4.

FIG. 4 is a fragmentary front elevational view as seen from the line 4—4 of FIG. 3.

FIG. 5 is a side elevational view of a dial shaft drive responsive to weight of material delivered to a weight scale receptacle, and showing also a return-to-zero mechanism.

FIG. 6 is a side elevational view of subtraction-weight indicating mechanism.

FIG. 6a is a view taken on the line 6a—6a of FIG. 6.

FIG. 7 is a drawing, in considerably reduced scale, showing the scale as arranged for subtraction weighing.

FIGS. 8 and 8a are across-the-line circuit diagrams.

FIG. 9 is a sectional view taken on the line 9—9 of FIG. 5, but on a considerably reduced scale.

FIG. 10 is a view taken on the line 10—10 of FIG. 6.

Figure 1:
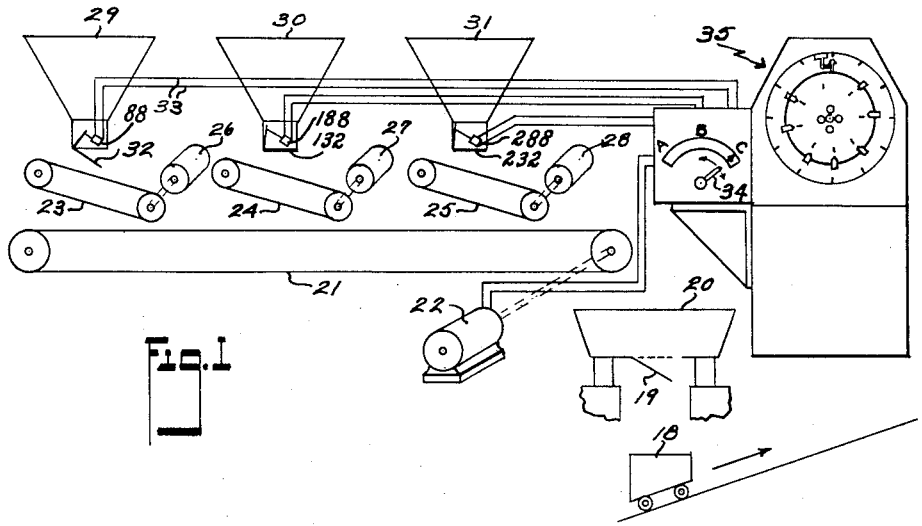
FIG. 1 is a schematic showing of a system embodying my invention.

Referring first generally to FIG. 1 there is shown schematically a scale receptacle 20 to which material of several classifications is delivered by a main conveyor 21 drive by a motor 22. Receptacle 20 can be emptied into a skip hoist 18 by opening a gate 19. Three auxiliary conveyors or feeder conveyors 23, 24, 25, carry respective materials to conveyor 21. Three motors 26, 27, 28 can be used to drive respective conveyors 23, 24, 25, or a single motor can drive all three feeder conveyors. As a matter of fact a single motor can drive the main conveyor and all feeder conveyors. These are features which can be arranged to suit specific requirements.

A plurality of supply containers 29, 30, 31, discharge onto respective feeder conveyors 23, 24, 25 whenever a bottom control gate on its respective container is opened, as will appear. In FIG. 1 the gate 32 on container 29 is shown as opened by suitable means such as a control 88 responsive to closing of a circuit through wires 33 responsive to manipulation of a selector handle 34 which is shown in position "C" at a control console 35. Position C corresponds to gate 32. Positions A and B correspond respectively to containers 31 and 30.

For simplicity we have shown only three containers and three control positions but as many as five, six, seven or more containers with respective controls may be in operation to feed a blast furnace or other ultimate location of use. The operator can manually shift his selector control to energize the delivery gate of any desired container to deliver the required material. Any or all of the conveyors may run continuously during active periods, or may run only while materials are being supplied to the scale receptacle 20.

I now proceed to a description of my novel and improved scale dial and combined control features, with special reference for the moment to FIGS. 2, 3, 4, 5, and 6.

The dial assembly proper is contained within a front housing comprising a rear wall 37 and a front shell or cover including a cylindrical peripheral wall 39 on which is carried a glass front wall 40. The peripheral wall 39 is shown in fragmentary detail in FIG. 2, having been swung open on a hinge 41. The ring 38 carries circularly disposed dial indicia 38a, which of course maintain a fixed position, hereinafter to be designated as the outer or fixed scale. A somewhat smaller rotatable disc 42 is fixed on a central shaft 43 and is rotatable therewith as will hereinafter appear. Disc 42 has dial indicia 42a around its periphery, hereinafter to be termed the inner or movable scale. The numbers on the outer scale 38a, as seen in FIG. 2, increase numerically clockwise, and the numbers on the inner scale 42a increase numerically counterclockwise, but both scales are adapted to show the same total weight.

Movable scale disc 42 carries a pointer 46, attached to disc 42 by screws 47. In FIG. 2 the disc 42 is shown in zero position, calibrated to come to rest at this point when the scale receptacle 20 is empty. As materials are dumped into the scale receptacle, disc 42 rotates clockwise, the pointer 46 showing actual weight on scale 38a, but as it happens the same weight will be shown on disc 42 at a point opposite a zero stop pin 48.

Figure 12:
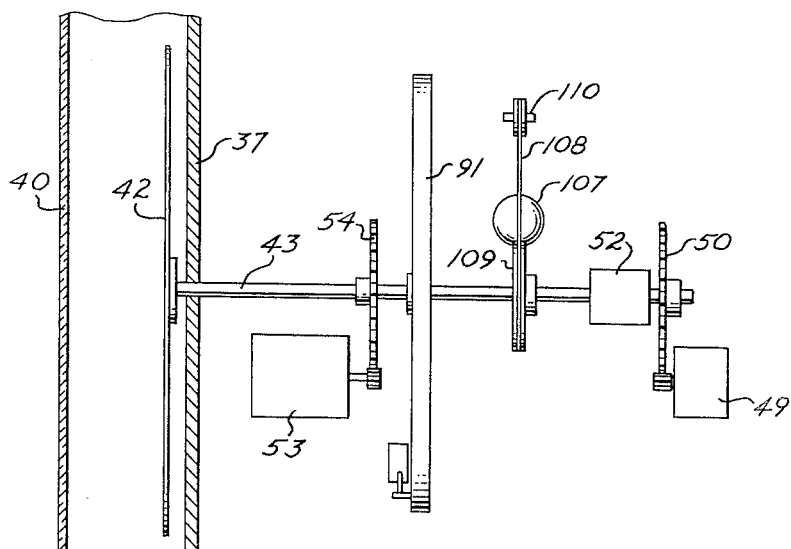
FIG. 12 is a schematic showing of the mechanical relationship between the parts shown in FIGS. 3 and 5.

The movable scale disc 42 can be made responsive to the weight of materials in receptacle 20 in a number of known ways. The weight signal can be mechanically transmitted by a leverage or linkage system, including a rack and pinion so as to turn dial shaft 43. A signal could be developed in a strain gage circuit, amplified electronically, applied to a servo motor, geared to shaft 43. Other ways could be used. I have selected the servo motor system for present illustration, and have shown in FIGS. 5 and 12 servo motor 49 with gearing 50 applied to a first shaft 51 which is effective on the driving member of a clutch shown merely in outer outline at 52. This clutch can be operated by means of an electrical energization as will appear. When engaged it drives the main dial shaft 43. A constant speed slow-motion motor 53, when energized, is effective on shaft 43 through gearing 54 to return shaft 43 and dial 42 to zero position but clutch 52 must be disengaged to permit this return-to-zero operation. The assembly shown in FIG. 5 is carried on or adjacent to the rear wall 37 of the dial housing in such position that shaft 43 passes through the rear wall, as indicated on FIG. 3, to operate disc 42 with its pointer 46. FIG. 12 shows in schematic form the relationship among all of the parts shown in FIGS. 3 and 5. The cyclic series of operations will later be explained.

Figure 2:
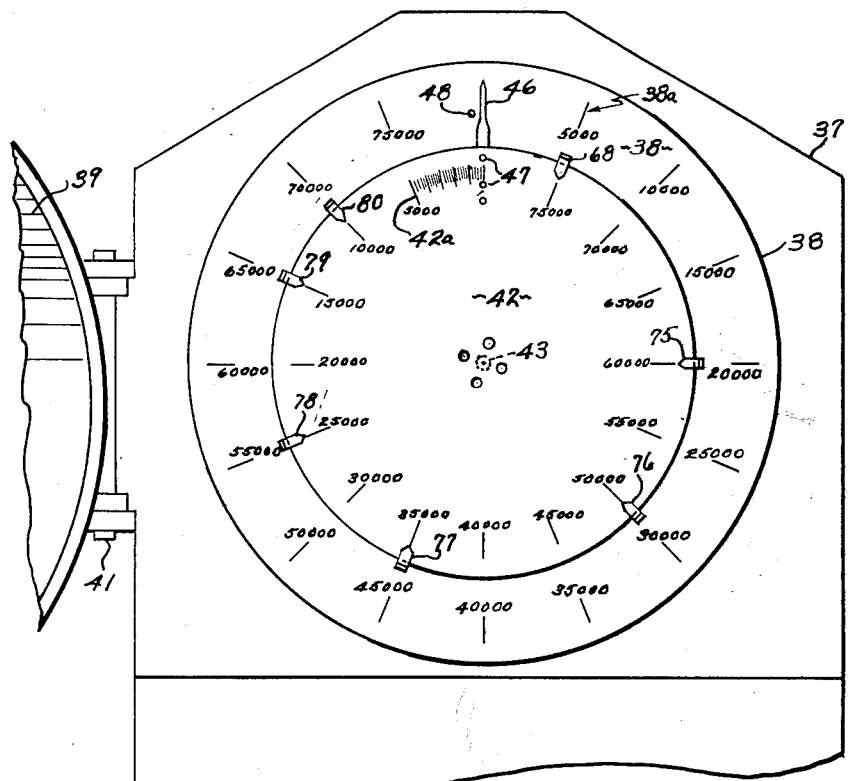
FIG. 2 is a front elevational view of a scale dial assembly, with its cover swung open and broken away, to show actual dial construction, somewhat enlarged.

While the schematic showing of FIG. 1 indicates three material supply sources and three positions A, B, and C of a selector, I show in FIGS. 2 and 3 a selector assembly comprising seven mercury switches capable of controlling seven supply sources. The operator will have a movable selector switch device adapted to place any one of these mercury switches in an operative circuit to control the amount of material from any selected supply source. Referring particularly to FIGS. 3 and 4 I show a bank of switches 56, 57, 58, 59, 60, 61 and 62 carried on a bracket 55 suspended from the inner top wall 39 of the swingable shell or cover. As best seen in FIG. 3 these switches are spaced lineally away from the scales 38 and 42 in respectively increasing distance increments. Each switch is of the mercury type, each having a mercury capsule 63 carried on a cradle which is shown best in FIG. 4, being freely rockable on a shaft 64. As is known to those skilled in the art when the cradle is rocked in one direction the switch contacts in the capsule are closed, and are opened upon movement of the cradle in the opposite direction.

Construction and operation of this type of switch mounting is described in my U.S. Patent No. 2,384,345 granted September 4, 1945. Briefly a trigger finger 67 carried on an adjustable tripper arm 68 attached to disc 42 in movement of dial 42 clockwise makes contact with strip 56b and tilts the cradle 56 to open the contacts in capsule 63 which, as will later appear, stops various moving members including disc 42. Finger 67 stops beyond the position shown in FIG. 4 in which the cradle has been rocked to such position that parts 70 and 72 are in contact, and the circuit through the mercury switch 63 has been opened to cut off the feed, as will appear.

A novel feature of my present invention comprises the use of small magnets 71, 72 at the end of strips 56a, 56b one of which is contacted by the respective magnetically susceptible bars 69, 70. This assures maintenance of the mercury switch in either fully open or fully shut position until it is positively moved therefrom. The two circuit leads from capsule 63 are shown at 73 and 74.

FIG. 2 shows a number of tripper arms spaced circumferentially around and affixed to disc 42. In addition to tripper 68 already described I have shown six additional ones at 75, 76, 77, 78, 79, 80. Each of these respectively operates its own mercury switch 57, 58, 59, 60, 61, 62 and no other. This is achieved by setting all the trigger fingers (such as 67 on arm 68) a different distance away from disc 42. In FIG. 3 I have shown the seven trigger fingers, but six of them are shown in dotted line to indicate that only one, in this case 67, can be in the position shown at one time. In this way each switch is operated only by its own tripper arm, and at the operator's console a rotatable selector switch can select any desired mercury switch so that in co-operation the mercury switch and the selector switch can energize a desired circuit, but only when disc 42 rotates to the position where this particular mercury switch is tripped by movement of the disc 42 to its tripping point.

Before proceeding to a description of the actual operating circuits I may state generally that if mercury switch 56 is in a circuit to control the flow from a sinter source, for example, and if a lot of five thousand pounds of sinter is to be supplied, the operator moves his selector switch to the sinter position; the sinter supply gate is opened; the conveyor delivers the lot to the scale receptacle 20; the dial 42 rotates; trigger 67 trips the cradle carrying capsule 63 away from the position shown in FIG. 4; the sinter supply is shut off; the conveyors stop after a brief time delay, as will appear.

Referring to unit 81 enclosed by a broken line in the wiring diagram of FIG. 8, I show power supply lines $L_1$ and $L_2$. The mercury switch 56 and a selector switch 82 are in series with a starting button 83 and a contactor relay coil 84. When the push button 83 is depressed it completes the circuit across the lines $L_1$–$L_2$ and relay coil 84 closes a maintaining circuit schematically shown as a switch 84a. It also closes another switch 84b in series circuit with conveyor motor or motors 22 which will be recalled as the conveyor motor of FIG. 1. Switch 84b, once closed by a linkage from coil 84, is maintained by a time delay schematically indicated at 87. Operation is as follows. The operator selects the material to be delivered and moves his selector switch control to close (in this instance) switch 82. He then depresses button 83 to close maintained switch 84a, after which he can release button 83. Coil 84 is energized, switch 84a is maintained, switch 84b is closed, and time delay 87 is energized. Conveyor motor starts and continues to run. Material is being delivered to container 20 because relay coil 84 is effective on the control 88 for gate 32 (FIG. 1). Dial 42 turns responsive to its servo motor 49 (FIG. 5) which receives its signal from receptacle 20 as previously described. When the particular trip arm arrives at its mercury switch 56, as shown in FIG. 4, switch 56 is opened de-energizing relay 84 which becomes effective upon the control 88 for the receptacle gate 32 (FIG. 1) to close the gate. If conveyor motor 22 were to be immediately stopped, some material would remain on the conveyor, and would thereafter be mixed with the next and different material to be delivered, so that I provide the time delay 87 which keeps switch 84b closed for a suitable time, perhaps five or ten seconds to clear the conveyors, after which switch 84b opens and motor 22 stops. This completes the operating cycle for the first material. Each additional material is controlled by its own respective circuitry, identical with that shown in rectangle 81 of FIG. 8, as is clearly illustrated in the electrical diagram of FIG. 11.

Figure 11:
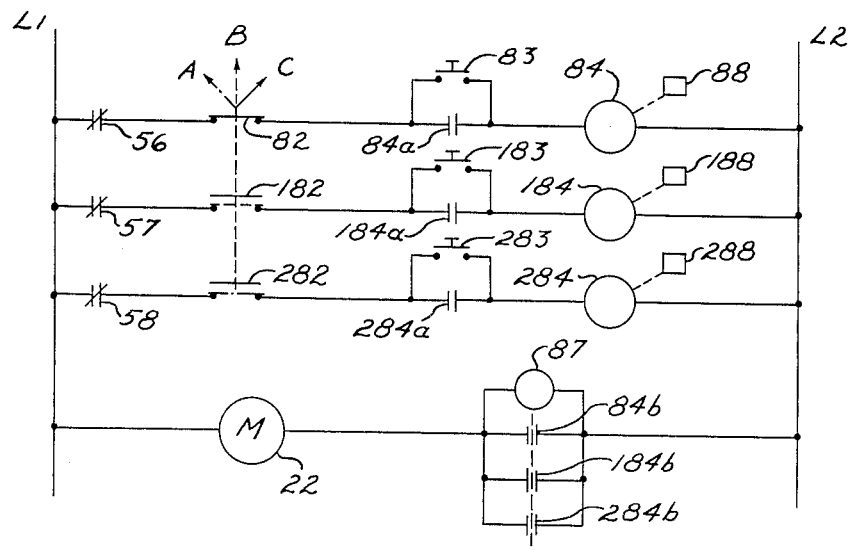
FIG. 11 is an across-the-line circuit diagram similar to FIG. 8 showing controls for a plurality of supply containers.

FIG. 11 shows a control system including means whereby material from a plurality of supply containers, such as the supply containers 29, 30 or 31, may be selectively supplied to the scale receptacle 20. As shown in the diagram, the selector 34 (FIG. 1), when in the full-line position "C," closes the switch 82 thereby making subsequent closing of the switch 83 effective to open gate 32 and deliver material from the container 29 to the receptacle 20 in the manner described above. The switch 84b controlled by the time delay relay 87 energizes the motor 22 as described.

Connected in parallel with the switches 56, 82, and 83 and the relay coil 84 are like circuit means for controlling material from the supply containers 30 and 31. If the seelctor 34 is moved to position "B," a switch 182 (shown in dotted line) connected in series with mercury switch 57 is closed whereby subsequent closing of a switch 183 energizes a relay coil 184 which in turn closes maintaining switch 184a and motor energizing switch 184b. The switch 184b is disposed in parallel with the switch 84b and is also controlled by the time delay relay 87 whereby the motor 22 of the conveyor 21 is again energized and maintained energized for a timed period after the supply of material is shut off. The relay 184 is effective on a control 188 for a gate 132 (FIG. 1) of supply container 30.

In a like manner, moving the selector 34 to position "A" closes switch 282 in series with another mercury switch such as 58. Material can then be delivered from supply container 31 by closing switch 283, energizing relay coil 284, closing switches 284a and 284b, and operating control 288 which opens and closes a gate 232 of supply container 31.

Attached to shaft 43 is a type wheel 91 which, as seen in FIG. 5, is an annulus carried on a hub 92 fixed to the shaft by a pin 93. A type wheel of this nature is shown in my U.S. Patent No. 2,610,843, granted September 16, 1952. It is fully described in said patent. It will only be necessary to say here that the annulus carries on its periphery embossed numbers corresponding to the weights shown on the dial, and these numbers are registered on a tape so as to make a permanent record of the weights delivered to the scale. In the present instance the type wheel is used to carry a trip finger 94 which operates a microswitch 95, FIGS. 5 and 7, in a manner and for a purpose now to be explained, with particular reference to the rectangle 96 in FIG. 8a.

In rectangle 96 the electric clutch assembly is shown at 52, receiving its power from a D.C. rectifier 97 energized from $L_1$–$L_2$. Microswitch 95 is biased to closed position, and a first material, such as sinter, has been added and the feed stopped. The operator pushes reset button 98 energizing contact relay coil 99 which closes maintaining switch contacts 99a and switch contacts 99b, the latter contacts starting reset motor 53. At the same time the time delay relay 101 is energized, disconnecting the electric clutch 52 by opening the normally closed contacts 101a. The pointer 46 returns to zero and stops when the normally closed microswitch 95 is opened. During the resetting movement, with the clutch de-energized, a red warning light 104 is on, contact 101b being also closed responsive to relay 101. The red light indicates to the operator that he should not add material to the conveyor while said light is on.

The cycle just described is repeated for any additional material added to the charge in the scale hopper.

When it is desired to dump the charge from the scale hopper into skip hoist car 18, the operator by any suitable means such as an air valve (not shown) opens gate 19 in the scale hopper. As part of this operation dump and reset switch 106 is closed which automatically returns the pointer to zero as described in the second preceding paragraph hereinabove, and at the same time the time delay relay 101 allows the servo motor to return to its zero position, or no-weight position.

To eliminate lost motion, and for another reason to soon appear, I use a small weight 107 on a cord 108 (FIGS. 5 and 9) which is coiled around a pulley 109 fixed on shaft 43, the cord being then looped over another pulley 110 on a bracket 111 fixed on the frame. The weight 107 is suspended on the free end of the cord. The weight is so applied as to maintain a slight torque on the shaft, eliminating lost motion in the gearing and the clutch. A secondary purpose of this weight is to hold the pointer against its zero stop while the clutch is disengaged and the servo motor is returning to zero position.

A positive stop 115 for pointer 46 is provided as shown in FIGS. 3 and 4. This stop 115 can be swung out of the way on the axis of a bearing pin 116 so as to permit zero adjustment of the pointer with respect to fixed scale 38a. In certain commercial equipment now available a pointer is zeroed against a fixed stop with the result that in some cases a considerable amount of material is charged into the scale hopper before the pointer ever leaves the zero position.

In a supply and control system of the present nature, a certain amount of "dribble" or "trickle" of material falls onto the scale hopper after the gate at the supply station is closed, and the mercury switch 56 is tripped. I have devised a means for maintaining a quite accurate weighing operation to compensate for this dribble. Referring to FIGS. 3 and 4, and assuming for example that the dribble amounts to one thousand pounds (the amount is exaggerated for clarity of illustration) an adjustable auxiliary pointer 114 is carried by member 68 (FIG. 4) and is set forwardly one thousand pounds on the dial from the actual center line of the tripping mechanism. In adjusting the tripping point, then, the tripping arm 68 is set at 4000 on the scale for dial 42, and when the dial stops at 4000 the auxiliary pointer will show that the ultimate weight in the scale hopper will be five thousand pounds.

An additional feature which I have found to be useful and convenient is an auxiliary pointer for what I term "subtraction weighing," and is shown in the embodiment of FIGS. 6 and 7. There are conditions, especially when small quantities of important materials are to be charged out of a hopper, which renders it desirable to weigh the material as it leaves the supply hopper rather than when it is delivered to a scale receptacle. Such an arrangement insures more convenient weighing, and is used, for example, in supplying ferro-manganese for a ladle of molten steel.

With my arrangement in this embodiment the pointer on the scale dial indicates the total amount of material in the scale hopper at all times. Referring to FIGS. 6, 7, and 10, there is shown the end of a shaft 117 carrying a main pointer 118 which is attached to the shaft. A knob 120 is attached to a shaft 121 which passes through a central grommet 122 in the front glass 123. Shaft 121 is fixed to a bridge or spider member 124. At its top and bottom ends the bridge 124 is cut away to provide clearance for the right ends of studs 125 which are threaded into the adjustable auxiliary pointer 119. The hub 127 is fixed to main pointer 118 and to shaft 117. The auxiliary pointer 119 is frictionally carried on the shaft in the following manner. There are frictional engaging surfaces at 128 between the hub 127 and the adjustable pointer, the engagement being normally assured by the expansion bias of compression spring 129, but in the showing of FIG. 6 the knob 120 has been depressed to the left, compressing spring 121' part way whereby to move spider 124 into contacting registry with studs 125. When the knob 120 is released, spring 121' moves the knob to the right, and spider 124 passes to the right beyond the ends of studs 125 to permit normal movement of pointers 118 and 119 together.

In the position shown in FIG. 6, however, the knob 120 has been depressed sufficiently to produce clearance at the point 128, and with the spider 124 engaging the outer end of studs 125 the knob can be turned to secure any desired angular spacing between pointers 118 and 119.

Bearing in mind that this embodiment is devised to assist the operator in withdrawing fixed fractional amounts from a supply placed so that the main pointer indicates the total weight, attention is specifically directed to FIG. 7. Pointer 118 will show at all times the total amount from which an increment is being taken. The adjustable or auxiliary pointer can be moved to show the amount which will be withdrawn. These two indications being simultaneously visible, there is little likelihood that an operator will attempt to take more from the supply source than is actually in said source.

As the material is being withdrawn the shaft 117 will rotate and the pointers 118 and 119 will turn counter-clockwise towards zero. When pointer 119 reaches zero it contacts a roller 130 on an operating finger 131 for microswitch 132. This switch controls the supply source to stop the flow of material in any suitable way, such as by closing a gate valve or otherwise. All the operator needs to know is the amount of material he requires. He then sets the movable pointer at that figure. The dial will tell him whether he can get that amount as he sets the movable pointer. It will also tell him how much will be left. He need do no mental arithmetic.

What is claimed is:
1. In a weighing system wherein a plurality of charging containers are disposed to supply a respective plurality of different ingredients and wherein each container is provided with flow control means for initiating and terminating discharge of an ingredient from its container and wherein means is provided for delivering discharged material to a receptacle for ultimate use, weight indicating and controlling means including, in combination,
   (1) a rotatable dial,
   (2) dial rotating drive means responsive to the weight of a material added to said receptacle and effective on said dial for producing a rotation of said dial proportional to the weight of said material thus added,
   (3) a plurality of electric circuits, each effective on a respective flow control means to cause initiation or termination of material flow from a respective container,
   (4) a respective normally control switch in each circuit,
   (5) a plurality of trip means adjustably positioned in angularly spaced positions on said dial representing desired weights of respective ingredients,
   (6) said control switches being disposed in fixed position adjacent said dial but at respectively different distances therefrom,
   (7) said trip means having operating fingers extending in respectively different distances from said dial but disposed so that each finger can operatively contact only one control switch whereby upon contact of a finger with its respective control switch one aforesaid circuit is broken to thereby terminate flow of material from a container.

2. A weighing system as defined in claim 1 wherein each said circuit is further provided with a respective normally open selector switch for putting said circuit in condition to be rendered operative and responsive to said control switch, and each selector switch being selectively operable to effect delivery of any one desired material when the respective control switch is operated by said trip means.

3. A weighing system as defined in claim 1 wherein each said control switch is a mercury switch rockable by said trip means to either one of two positions consisting of a switch-closed position and a switch-open position depending on the direction of travel of said dial, and means for retaining said switch in either position with a light but effective adhering force.

4. A weighing system as defined in claim 3 wherein said retaining means consists of two self-attracted members, one being a permanent magnet and the other an armature of magnetizable material.

5. A weighing system as defined in claim 1 wherein said dial is provided with scale indicia for indicating weights, whereby rotation of said dial past a fixed index point indicates changing scale weight, and corrector means carried by each said trip means to correct the trip means position to conform with added material trickle after the flow control means is actuated to terminate material flow.

6. A weighing system as defined in claim 5 wherein said corrector means consists of a respective finger carried by each trip means, and spaceable away from its trip means along the direction of dial rotation, the spacing being for a dial-indicated weight amount corresponding to the average trickle of the respective material being delivered.

References Cited in the file of this patent
UNITED STATES PATENTS

| | | |
|---|---|---|
| 772,588 | Tindall | Oct. 18, 1904 |
| 1,730,914 | Brubaker | Oct. 8, 1929 |
| 2,630,971 | Vroom | Mar. 10, 1953 |
| 2,749,041 | Gersch | June 5, 1956 |
| 2,768,946 | Filippi et al. | Oct. 30, 1956 |
| 2,887,268 | Grinage | May 19, 1959 |
| 2,998,189 | Durand | Aug. 29, 1961 |